United States Patent Office 2,780,307
Patented Feb. 5, 1957

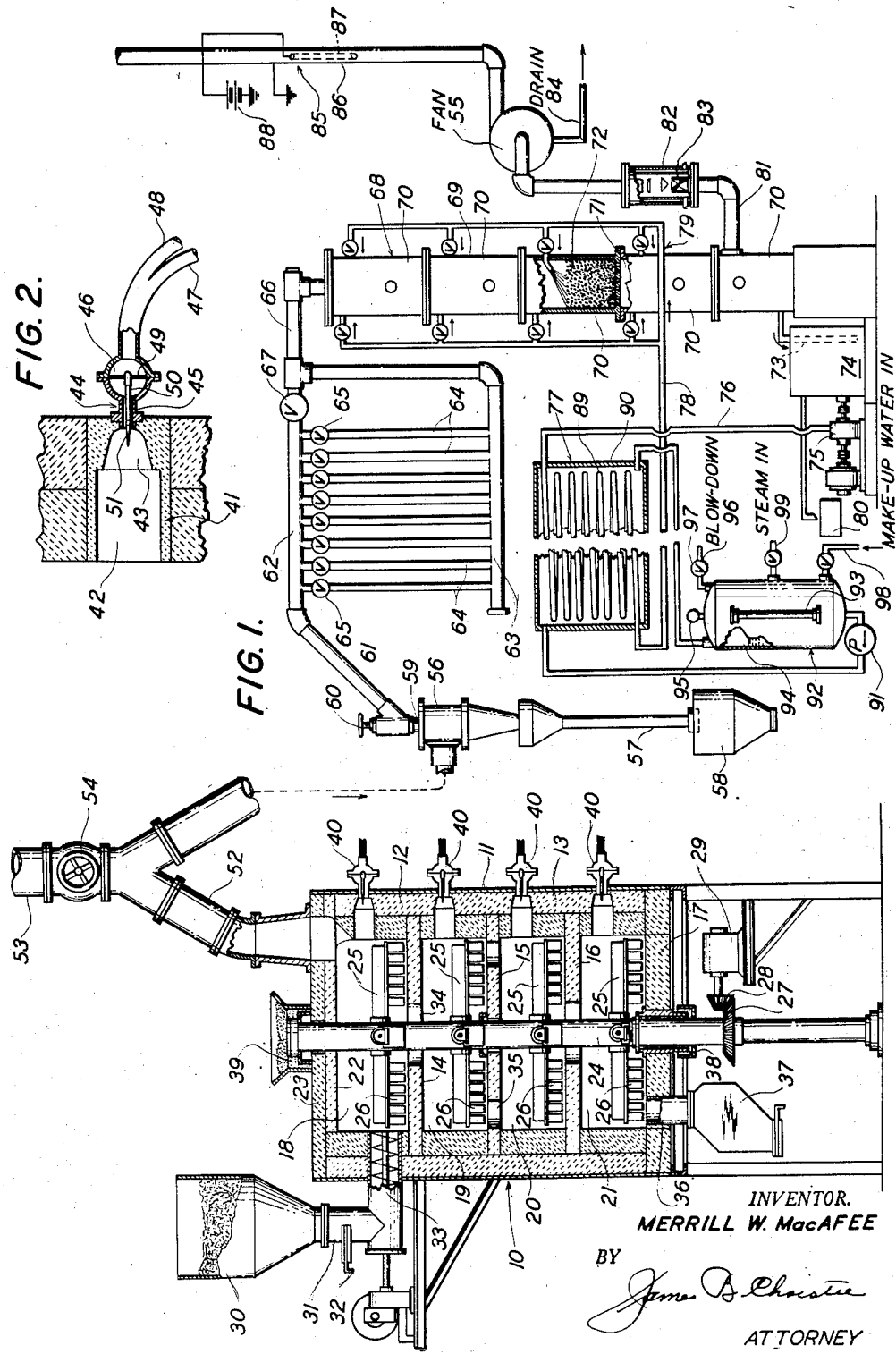

2,780,307

RECOVERY OF ELEMENTAL SULPHUR FROM A GAS SYSTEM

Merrill W. MacAfee, Los Angeles, Calif., assignor to Pacific Foundry Company, Ltd., San Francisco, Calif., a corporation of California Application May 28, 1953, Serial No. 358,008

9 Claims. (Cl. 183—32)

This invention concerns the recovery of elemental sulphur from a gas stream in which the sulphur may exist as a vapor or an entrained liquid or solid. It provides an improved method and improved equipment for such sulphur recovery.

The invention is of utility in recovering elemental sulphur vapor from gas streams of any origin but is particularly suitable for removing sulphur vapor from hot gas streams produced in sulphur vaporizing furnaces in accordance with the invention described and claimed in the co-pending application of Hartley and Rankin, Serial No. 352,534 filed May 1, 1953.

The term "sulphur vapor" is sometimes employed herein to include finely divided sulphur in any of its physical states suspended in a gas stream.

Sulphur vapor may be recovered from hot gases containing it by scrubbing it in water, but the resulting product is not suitable for market and requires de-watering and other operations before it can be sold. Consequently, there is an advantage to absorbing the sulphur from a gas stream in molten sulphur, but heretofore customary practices along this line have not been entirely successful and tend to produce a sulphur aerosol which passes through the system and escapes.

Sulphur is particularly difficult to recover from highly heated gases, say those heated above the boiling point of sulphur. Sulphur boils at approximately 445° C. or 832° F. at atmospheric pressure and it would be expected that sulphur would condense and drop out of a gas stream when cooled to such a temperature. In practice, however, this does not occur, and I have found that so long as the temperature of the gas stream stays about 507° F., the sulphur apparently continues to behave as a gas and no condensation appears to result, at least within a reasonable time.

If a gas stream containing sulphur vapor at a temperature near the boiling point of sulphur is brought into contact with molten sulphur, some condensation results and a small amount of sulphur is absorbed by the molten sulphur from the gas stream. However, the bulk of the sulphur in the gas stream—in some cases as much as 70%—appears to be converted into an aerosol or mist which is not absorbed by the molten sulphur and tends to pass through a scrubber through which the molten sulphur is circulated irrespective of the circulation rate.

In accordance with my invention, sulphur vapor is recovered from a gas stream by cooling the gas stream to a temperature below the boiling point of sulphur but not below about 507° F. by indirect heat exchange and thereafter the cooled gas is brought into direct contact with molten sulphur, preferably in a scrubbing tower. For optimum results the gas stream and the molten sulphur stream should flow concurrently with each other through the scrubber so that the hottest gas comes into contact with the coolest molten sulphur.

After the contact between the gas and the molten sulphur, some sulphur may remain entrained in the gas stream, but I have found that the great bulk of this can be removed by swirling the gas to throw entrained sulphur out of it by centrifugal action. Small residual amounts of sulphur, if any, may be removed thereafter by passing the gas stream through a porous solid medium such as a tower packed with Raschig rings or berl saddles, or by electrostatic precipitation.

Sulphur, if heated somewhat above its melting point, tends to become so viscous that it will not flow. Consequently, it is important to control the temperature of the circulated sulphur within a close range, say 250° F. to 300° F. I have discovered that control is facilitated by bringing the circulating sulphur into indirect heat exchange with another liquid, preferably super-heated water. In normal operation, the molten sulphur from the scrubber contains excess heat and the heat transfer will be from the sulphur to the other liquid, say super-heated water. However, during starting-up operations, the transfer of heat may be in the other direction. In either case, the use of super-heated water is desirable because it may be maintained at a substantially constant temperature by regulating the pressure of a closed system through which the super-heated water circulates.

These and other aspects of my invention will be understood more thoroughly in the light of the following detailed description taken in conjunction with the accompanying drawings in which:

Fig. 1 is a diagram, partly in section, of a complete sulphur extraction plant incorporating my invention; and Fig. 2 is an enlarged section through a fuel burner of Fig. 1.

As indicated at the outset the invention is applicable to the recovery of sulphur vapor from any gas stream irrespective of source, but has proved to be highly desirable in recovering sulphur from the gas produced in the vaporizing furnace described and claimed in the aforementioned co-pending application. For convenience it is described below in relation to this furnace 10 which comprises an upright air tight steel shell 11 with an annulus of heat insulating material 12 immediately within it, this annulus being protected by another annulus 13 of fire brick which forms the inner furnace wall. The furnace has four relatively level refractory ceramic hearths 14, 15, 16, 17 overlain respectively by relatively high furnace chambers 18, 19, 20, 21. The furnace has a refractory top 22 which is overlain by a heat insulating layer 23.

The furnace has a conventional central vertical shaft 24 passing through the hearths and the top and supporting four radial rabble arms 25 just above each hearth level. Each arm carries a series of conventional rakes 26 which are pitched to rabble the material on the hearths and at the same time move it in spiral paths across the hearths. The arms are air-cooled from the insides by conventional means (not shown), say the usual piping and a low pressure blower. The shaft is driven through a ring gear 27 and pinion 28 from a conventional motor 29 equipped with a speed reducer, which may (if desired) be variable to take account of variations in the sulphur content of the charge.

The furnace charge is fed continuously from a hopper 30 that discharges through a vertical pipe 31 equipped with an air-tight sliding gate 32 into a conventional horizontal screw feeder 33 that is choke fed and which discharges through the furnace wall onto the top hearth. This arrangement is substantially air-tight. The charge is rabbled in a converging spiral path across the top hearth to a central drop hole 34 adjacent the shaft, thence across the second hearth in a diverging spiral to drop holes 35 adjacent the furnace wall and so on until it drops through an outlet pipe 36 on the periphery of the lowest hearth into a sealed bin 37 from which it is removed from time to time in batches.

To keep the furnace gas-tight an annular lute or seal 38 filled with pine particles of charge is provided around the shaft where it passes through the lowest hearth, and a similar seal 39 is provided where the shaft passes through the top of the furnace.

Each hearth is provided with a plurality of burners 40 (only one being shown per hearth). One burner is shown in detail in Fig. 2. It comprises a refractory cylinder 41 mounted horizontally in the furnace wall. Opening directly into the furnace there is a combustion chamber 42 about 9" long. The rear of this chamber merges into a tapered ignition chamber 43. A nozzle 44 is sealed into the small end of the ignition chamber from outside the furnace. It comprises a flanged tube 45 backed by a spherical pre-mixing chamber 46 into which metered amounts of air and natural gas are fed under pressure respectively through feed pipes 47, 48. A vertical bar 49 in the mixing chamber carries a rod 50 which extends concentrically through the burner pipe. This rod tapers toward the furnace and carries a ceramic tip 51 which projects from the pipe into the ignition chamber. This tip glows when the burner is operating and aids in igniting the mixture of air and natural gas ejected from the nozzle.

The pre-mixed volume of fuel is fed at very low pressure into the ignition chamber, the ratio of natural gas to air fed being calculated to burn all the oxygen in the air to $CO_2$ and $H_2O$, with no CO or excess oxygen present. About 3 cubic feet of natural gas is required per pound of sulphur evolved, and this figure is changed but little by the grade of the ore, since 1.85 cubic feet of the gas is required to supply the heat of vaporization of the pound of sulphur, the balance being consumed in heating the other gases and the gangue present and as heat lost to the atmosphere by radiation, convection, etc. of the furnace.

Combustion of the fuel air mixture is substantially completed in the relatively short combustion chamber, so that there is no free oxygen and substantially no CO to react with sulphur vapor in the furnace. A substantially neutral atmosphere is thus assured.

Sulphur vapor evolved on the several hearths in the furnace mingles with the combustion gases and rises countercurrent to the feed to be withdrawn from the top hearth through a flue 52 provided with an auxiliary stack or vent 53 to atmosphere. This vent is opened during starting periods when the furnace is being heated preparatory to receiving the charge, but during normal operation is closed by a valve or gate 54, draft for the furnace being then provided by a fan 55 near the end of the system.

The next unit in the system is a cyclone collector 56, which may be of conventional type, but preferably is constructed in accordance with the disclosure of co-pending application Serial No. 366,118, filed July 6, 1953, by Ruth and MacAfee. Such a collector effectively removes calcine dust from the gangue down to minus-micron size with no external power required and with but little pressure loss. The dust collected drops through a vertical pipe 57 into a relatively large sealed hopper 58 from which it is removed from time to time, it having been found that with very fine charges as much as ½% of the gangue may be carried out of the furnace as dust.

The gas outlet pipe 59 from the cyclone collector has a control valve 60 for flow regulation purposes and is connected to a gas cooler 61 comprising an inlet manifold pipe 62 and an outlet manifold pipe 63 joined by a plurality of parallel cooler tubes 64, each with a shut-off valve 65 at its inlet. The outlet manifold is connected by a pipe 66 to the top of a condensing tower, but all or part of the cleaned gas may be sent around the cooler to the condensing tower through a valved by-pass 67.

The amount of cooling surface to be employed will depend upon the temperature and volume of the furnace gas, its sulphur content and its content of heteropolar gases. But the effective cooling surface may be varied over wide limits by adjusting the gas flow through the by-pass and by cutting tubes in and out of service by means of their respective valves.

The gases from the cooler are fed into the top of the vertical condenser tower or scrubber 68. This consists of an insulated cylindrical steel shell 69 having five superposed compartments 70. The compartments are separated by horizontal grids 71 held in flanges. The four upper compartments are partially filled with berl saddles which act as tower packing 72. The lowest compartment collects liquid sulphur which is drained out through a submerged pipe 73 into a steam-jacketed sump 74. From the sump liquid sulphur is drawn by a positive-displacement or centrifugal pump 75 and passed through a steam-jacketed pipe 76, an indirect heat exchanger 77, where the liquid sulphur gives up part of its heat to superheated water, as described later. From the heat exchanger the still liquid sulphur is forced back to the tower through a steam-jacketed pipe 78 and may be introduced into any or all of its four upper compartments through a valved manifold 79. The liquid sulphur thus introduced trickles downward through tortuous paths in the tower packing concurrently with the flow of gas and condensing and absorbing sulphur from the vapor, so that at the bottom of the tower substantially all the sulphur is condensed.

The production or "make" of sulphur in the tower is permitted to overflow from the upper portion of the sump into wooden molds 80 where it freezes into blocks. Other arrangements can, of course, be provided for handling the final product.

The gases issuing from the base of the tower through a side-pipe 81 are free of sulphur save for a small amount of mist. The great bulk of this mist is removed by passing the gas upward through a sealed mist eliminator 82 equipped with spiral baffles 83 which cause the gas to whirl and throw the mist particles by centrifugal force outward to impinge on the eliminator wall and form a thin liquid film. This film trickles down through the eliminator and the side pipe into the bottom compartment of the tower, where it joins the rest of the make. The mist eliminator is described in greater detail and claimed in co-pending application Serial No. 368,892, filed July 20, 1953.

The fan 55 is connected in the system following the mist eliminator. It is provided with a drain 84, and any sulphur thrown out of the gas stream by the centrifugal action of the fan is withdrawn through this drain, the fan being kept hot by insulation or heating jacket (not shown) so that the sulphur is liquid and free flowing.

Some sulphur, thought to be principally in the form of an aerosol, is uncaptured in the mist eliminator and the fan. This may be trapped in a small heated electrostatic precipitator 85 of either tubular or multiple plate construction. In Fig. 1 the treater shown is of tubular type with its metal exhaust stack 86 serving as the grounded electrode. The other electrode is a steam-heated pipe 87 disposed concentrically in the stack and insulated from it. A flow of high voltage rectified current is maintained between the electrodes by a conventional source 88.

If desired, a tower packed with berl saddles or Raschig rings may be employed in addition to or instead of the electrostatic precipitator. Such a tower (not shown) is preferably upright, the gas stream being admitted tangentially at the bottom.

Returning now to the heat exchanger system, it should be borne in mind that its function is to remove from the molten sulphur leaving the tower the heat which it picked up in its passage through the tower. The amount of heat thus removed must be regulated closely so that the sulphur returned to the tower will be hot enough to flow readily but not so hot that it becomes viscous in the tower or on its way to it. This result is accomplished readily in the heat exchanger which consists of a jacketed pipe 89. The sulphur is pumped through this pipe and superheated water is pumped counter current to it in the jacket 90 by a conventional hot water pump 91 which draws the superheated water out of the bottom of an equalizer drum or boiler 92 and returns it to the upper portion of the drum after it has passed through the heat exchanger. The drum is provided with a conventional sight glass 93 and the water in the drum is held at an intermediate level during operation, leaving a space 94 for steam in the top of the drum. The drum has a conventional steam pressure gauge 95 and a blowdown or steam exhaust line 96 at the top. This line has a pressure-relief valve 97 which opens at a predetermined gauge pressure to release the steam generated from the heat captured in the exchanger.

The drum is also provided with a make-up water line 98 for the introduction of water required to replace that released as steam. It is also provided with a steam line 99, through which high pressure steam from another source may be introduced, for example during starting-up periods, so that the heat exchanger may be heated above the melting point of sulphur and thus avoid plugging of the tower circulation.

In starting the apparatus of Fig. 1, the furnace is heated to operating temperatures by the burners while it is exhausted to atmosphere and before any feed is introduced. After the furnace is hot the stack valve is closed; the fan is started, and hot furnace gases are pulled through the cyclone, the cooler, the tower and the rest of the gas conduit system until the cyclone, the cooler and the flue system ahead of the tower are hot enough to prevent substantial sulphur condensation. As soon as possible, the feed is started through the furnace in order to provide some sulphur vapor in the flue system. The combustion gases alone lose their heat rapidly by radiation to the surrounding atmosphere without heating the walls of the flues and the cooler to a marked degree, and it has been found that only a small amount of sulphur vapor in the gas aids greatly in getting the flue system up to safe operating temperatures.

While the gas conduit system is being heated, the circulating system for the molten sulphur is also brought up to temperature. As noted, the sulphur circulating lines to and from the condenser may be steam jacketed and in any event should be lagged with adequate heat insulation, say conventional magnesite steam pipe covering. The sulphur in the sump may be liquefied by the action of its steam jacket. The heat exchanger is heated up with superheated water to a temperature well above the melting point of sulphur, thus reversing the direction of heat exchange temporarily. The heating of the exchanger is accomplished by the introduction of live steam into the equalizer while circulating the water through it and while maintaining the pressure somewhat above normal so as to assure adequate superheat in the water. Thereafter, the circulation of molten sulphur is started from the sump, and as soon as it is well established the furnace operation is raised to normal by increasing the charge rate and the firing.

To consider a normal operation of the apparatus of Fig. 1, the charge was a native sulphur ore containing about 40% sulphur by weight in a gangue of travertine, sandstone and gypsum. The ore contained about 3% moisture by weight and was all crushed to pass a ½" screen. It was introduced into the top hearth of the furnace continuously, the feed rate being equivalent to about 60 pounds of sulphur per hour.

All four hearths were fired with a stoichiometric mixture of natural gas and air. The burning was complete in the burner so that the hot gas discharged into the chambers above the hearths contained substantially no excess fuel, oxygen or carbon monoxide. The top hearth was maintained at a temperature of about 1000° F., with the second hearth at 1150° F., the third hearth at 1335° F., and the bottom hearth at 1445° F. The natural gas consumption was about three cubic feet per pound of sulphur evolved and the approximate average residence time of the charge in the furnace was about 15 minutes. Complete evolution of sulphur was obtained and the calcine or residue discharged from the bottom hearth contained no uncombined sulphur.

The mixture of sulphur vapor and gaseous combustion products was discharged from the top hearth at the prevailing temperature, i. e. 1000° F. The gas contained about 33% sulphur and about 6% carbon dioxide, both by volume. The balance was largely water vapor and nitrogen, although there was a small percentage of $H_2S$, $SO_2$, and COS formed by side reactions, due possibly to the presence of the water vapor.

The mixture of sulphur vapor and gas was passed through the dust collector, where substantially all of the dust was removed, and entered the cooler at a temperature of about 930° F. Gas leaving the cooler had a temperature of 645° F. and entered the top of the condenser at 640° F. Thermometers placed in each compartment of the condensing or scrubbing tower indicated that the temperature in the top condenser compartment was 295° F., in the second 275° F., in the third 270° F., in the fourth 264° F., and in the bottom compartment 262° F. The molten sulphur in the sump was likewise at a temperature of 262° F. and entered the heat exchanger at the same temperature. Leaving the heat exchanger the molten sulphur had a temperature of 259° F.

The pressure on the equalizer drum and the rest of this closed system including the "water" side of the heat exchanger was about nine pounds per square inch gauge.

The overall sulphur recovery was about 90%, the loss being largely in the gas discharged from the exit of the system. The loss was in the form of $H_2S$, $SO_2$, and COS. The efficiency of the condenser system itself was at least 98% of the elemental sulphur in the gas stream from the furnace. The purity of the sulphur recovered was consistently above 99.5%.

It has been found that irrespective of the grade of sulphur in the ore satisfactory results are obtained if the temperature above the top hearth of the furnace is in the range of 950° F.–1000° F. Temperatures below this range may cause trouble through the accretion of charge particles by viscous sulphur. Temperature above 1000° F. tend to produce sulphur aerosol in the condensing system and are, in general, wasteful.

As indicated at the outset, the temperature of the gas mixture entering the condenser may be dropped as low as 507° F. without accumulation of sulphur ahead of the condenser. For safety's sake, however, this temperature should not be allowed to drop below about 520° F.–540° F. and good recoveries are obtained when the gas mixture entering the condenser is at a much higher temperature, say 660° F. It will be noted that this temperature is also well below the boiling point of sulphur, i. e. 832° F.

The physical condition of the sulphur passing through the cooler is not known, but there are indications that a portion of it is in the form of very large molecules, say as high as $S_{32}$. However, if cooling is gradual it is probable that the bulk of the sulphur molecules in the vapor state just above the boiling point are in the form $S_8$. Unless the gases are chilled too rapidly between the furnace and the condenser the sulphur probably enters the condenser in the form $S_8$ or higher, the smaller higher temperature molecules (such as $S_4$ and $S_2$) which produce aerosols, being present, if at all, in only small proportion. In any case, under the conditions specified, the bulk of the sulphur in the gas stream is easily absorbed by the molten sulphur in the condenser, so that there is no need for water or acid absorption means to recover sulphur present as a smoke or aerosol.

The cooling considerations in the condensing tower are entirely different from those ahead of it. The cooling and absorption means in the tower is a flowing stream of molten sulphur and it is important that the temperature and circulation rate of this stream be such that it neither freezes in the tower nor becomes viscous at higher temperatures. Sulphur at 368° F. is 62,000 times as viscous as water. The melting point of sulphur is 242° F. Between these two temperatures there is a permissible tower operating range which lies approximately between 250° F. and 300° F. This range can be maintained by regulation of the flow rate of liquid sulphur through the tower and its temperature at the tower entrance.

The quick reduction in temperature required in the tower is best obtained with concurrent flow of gas and liquid sulphur. This is arranged by introducing both molten sulphur and gas at the top of the tower so that they flow down together. The sulphur is introduced as a heavy maelstrom-like spray of moderate size droplets through multiple spray nozzles in the open space above the tower packing in order to exchange the heat in the gas with the sulphur as rapidly as possible. If gases are introduced at the bottom of the tower so that they flow upwardly countercurrently to the falling molten sulphur the hottest gases are met by the hottest sulphur, which is an unfavorable condition. With concurrent flow through the tower the coldest sulphur comes in contact with the hottest gas, with resulting chilling effect and with the further advantage that the vapor pressure of the molten sulphur is reduced quickly so that less mist is formed. The tower temperature gradients indicated in the foregoing example have been found to be excellent.

For a production of 100 tons of sulphur per day from a single multi-hearth furnace it is proposed to employ two parallel recovery systems. Each such system will have two dust collectors in series each with barrels about 42 inches in diameter, followed by a cooler consisting of twenty-four 12" steel pipes each 20' long, in parallel. Each radiator will feed two condenser towers in each branch of the recovery system, these towers being composed of six superposed sections each 7½ feet in diameter and each filled to a depth of approximately 2' with ¾" beri saddles.

The efficiency of the cooler system ahead of the condenser in the system of my invention is improved by the presence of the carbon dioxide, water vapor and other heteropolar compounds in the gas stream. Neither nitrogen nor sulphur is heteropolar and hence does not give up its heat easily by radiation, the heat dissipation mechanism being one of impact between the heteropolar molecules and the symmetrical molecules followed by the radiation of the heat thus picked up by the heteropolar molecules, principally $CO_2$ and $H_2O$. Experience has shown that with large concentrations of heteropolar gases in the stream passing through the cooler much of it should be cut out, lest the cooling be too sudden with resultant formation of sulphur aerosol.

Concentration of heteropolar gases in the stream may be increased by introducing water into the stream, since water is one of the heteropolar gases.

I claim:

1. In the recovery of sulphur vapor from a hot gas stream having a temperature in the neighborhood of the boiling point of sulphur, the improvement which comprises cooling the gas stream to a temperature not lower than about 540° F. by indirect heat exchange, scrubbing the cooled gas stream with molten sulphur moving concurrently to the gas stream, then swirling the gas stream to throw entrained sulphur out of it by centrifugal action, and thereafter removing additional sulphur from the stream by passing it through a porous solid medium.

2. In apparatus for recovering sulphur vapor from a hot gas stream, the combination which comprises a scrubber, means for passing the gas through the scrubber, means for circulating molten sulphur through the scrubber, an indirect heat exchanger having two sides, means for passing the circulating molten sulphur through one side of the exchanger, means for circulating superheated water through the other side of the heat exchanger in indirect heat exchange with the circulating molten sulphur, a boiler in closed circuit with the side of the heat exchanger through which the superheated water is circulated, means for bleeding steam from the boiler, means for introducing water into the boiler, and means for introducing steam into the boiler.

3. In the recovery of sulphur from a hot gas stream in which it is present as vapor, the improvement which comprises passing the hot gas stream in direct contact and heat exchange with a circulating stream of molten sulphur and thus cooling the gas so that at least some of its sulphur vapor is condensed to molten sulphur and merged in the circulating molten sulphur stream while the circulating molten sulphur stream is simultaneously heated, cooling the circulating molten sulphur stream thus heated by passing it in indirect heat exchange relationship with superheated water prior to returning it to contact with the hot gas stream, the superheated water being maintained at superatmospheric pressure, and regulating the temperature of the returned molten sulphur and keeping the circulating molten sulphur stream in a non-viscous state by controlling the degree of superatmospheric pressure on the superheated water.

4. In the recovery of sulphur from a hot gas stream in which it is present as vapor, the improvement which comprises passing the hot gas stream in direct intimate contact and heat exchange concurrently with a circulating stream of molten sulphur and thus cooling the gas so that at least some of its sulphur vapor is condensed to molten sulphur and merged in the circulating molten sulphur stream while the circulating molten sulphur stream is simultaneously heated, cooling the circulating molten sulphur stream thus heated by passing it in indirect heat exchange relationship with superheated water prior to returning it to contact with the hot gas stream, the superheated water being maintained at superatmospheric pressure, and regulating the temperature of the returned molten sulphur and keeping the circulating molten sulphur stream in a non-viscous state by controlling the degree of superatmospheric pressure on the superheated water.

5. In the recovery of sulphur from a hot gas stream in which it is present as vapor, the improvement which comprises passing the hot gas stream in indirect heat exchange relationship with a cool gas, varying the cooling of the hot gas stream by the cool gas by varying the surface area over which the indirect heat exchange occurs, thereafter passing the partially cooled gas stream in direct intimate contact and heat exchange with a circulating stream of molten sulphur and thus cooling the gas so that at least some of its sulphur vapor is condensed to molten sulphur and merged in the circulating molten sulphur stream while the circulating molten sulphur stream is simultaneously heated, cooling the circulating molten sulphur stream thus heated by passing it in indirect heat exchange relationship with superheated water prior to returning it to contact with the hot gas stream, the superheated water being maintained at superatmospheric pressure, and regulating the temperature of the returned molten sulphur and keeping the circulating molten sulphur stream in a non-viscous state by controlling the degree of superatmospheric pressure on the superheated water.

6. In the recovery of sulphur from a hot gas stream having a temperature in excess of the boiling point of sulphur so that the sulphur is present in vapor form, the improvement which comprises cooling the gas stream gradually by indirect heat exchange to a temperature not lower than about 507° F., thereafter passing the partially cooled gas stream in direct intimate contact and heat exchange with a circulating stream of molten sulphur and thus cooling the gas further so that at least some of its sulphur vapor is condensed to molten sulphur and merged in the circulating molten sulphur stream while the circulating molten sulphur stream is simultaneously heated, cooling the circulating molten sulphur stream thus heated by passing it in indirect heat exchange relationship with superheated water prior to returning it to contact with the hot gas stream, the superheated water being maintained at superatmospheric pressure, and regulating the temperature of the returned molten sulphur and keeping the circulating molten sulphur stream in a non-viscous state by controlling the degree of superatmospheric pressure on the superheated water.

7. In apparatus for recovering sulphur from a hot gas stream in which the sulphur is present as vapor the combination which comprises a scrubber, means for passing the gas stream through the scrubber, means for passing the stream of molten sulphur through the scrubber in contact with the gas stream, an indirect heat exchanger having two sides, means for passing the molten sulphur stream from the scrubber through one side of the heat exchanger, means for returning the molten sulphur stream from the heat exchanger to the scrubber, means for passing superheated water through the other side of the heat exchanger at superatmospheric pressure, and means for regulating the superatmospheric pressure on the water passed through the heat exchanger.

8. In apparatus for recovering sulphur from a hot gas stream containing its vapor, the combination which comprises a scrubber, means for passing the gas stream downwardly through the scrubber, means for passing a stream of molten sulphur downwardly through the scrubber, an indirect heat exchanger having two sides, means for passing molten sulphur from a lower portion of the scrubber through one side of the heat exchanger, means for returning molten sulphur from the indirect heat exchanger to an upper portion of the scrubber to flow downwardly therein, means for passing superheated water at superatmospheric pressure through the other side of the indirect heat exchanger, and means for holding substantially constant the pressure of the water passed through said other side.

9. In apparatus for recovering sulphur from a hot gas stream containing its vapor, the combination which comprises a scrubber, means for passing the gas stream downwardly through the scrubber, means for passing a stream of molten sulphur downwardly through the scrubber, an indirect heat exchanger having two sides, means for passing molten sulphur from a lower portion of the scrubber through one side of the heat exchanger, means for returning molten sulphur from the indirect heat exchanger to the scrubber at a plurality of different elevations on the scrubber, means for passing superheated water through the other side of the indirect heat exchanger, and means for controlling the pressure of the water passed through said other side.

References Cited in the file of this patent

UNITED STATES PATENTS

| | | |
|---|---|---|
| 1,314,634 | Collins | Sept. 2, 1919 |
| 1,851,765 | Henshall | Mar. 29, 1932 |
| 1,957,006 | Wescott | May 1, 1934 |
| 2,002,860 | Levy | May 28, 1935 |
| 2,031,554 | Torchet | Feb. 18, 1936 |
| 2,087,894 | Bacon et al. | July 27, 1937 |
| 2,386,390 | Fernelius et al. | Oct. 9, 1945 |
| 2,528,032 | Candler et al. | Oct. 31, 1950 |
| 2,534,792 | Nevins et al. | Dec. 19, 1950 |
| 2,596,795 | Melly Jr. et al. | May 13, 1952 |
| 2,603,464 | Nevins et al. | July 15, 1952 |
| 2,629,133 | Morningstar | Feb. 24, 1953 |
| 2,708,983 | McCarthy | May 24, 1955 |

FOREIGN PATENTS

| | | |
|---|---|---|
| 102,216 | Sweden | Aug. 5, 1941 |